Oct. 31, 1944.     G. JaKUBIAK     2,361,631
MEASURING INSTRUMENT
Filed May 27, 1943
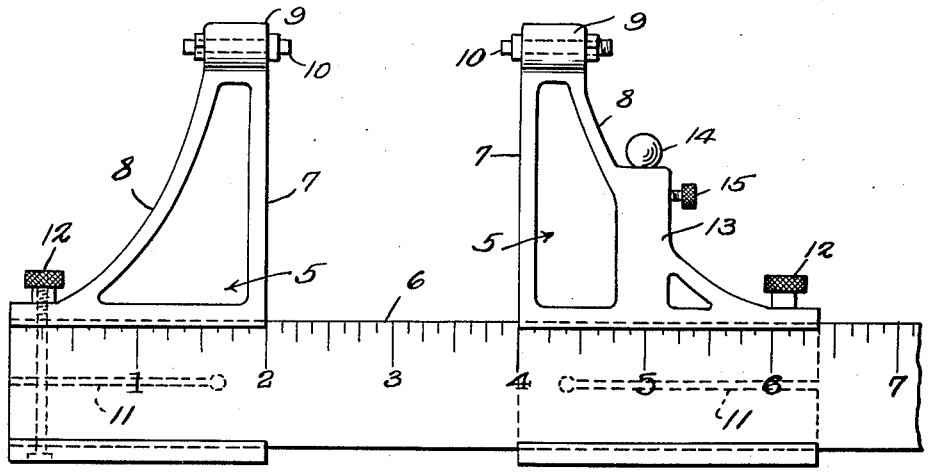
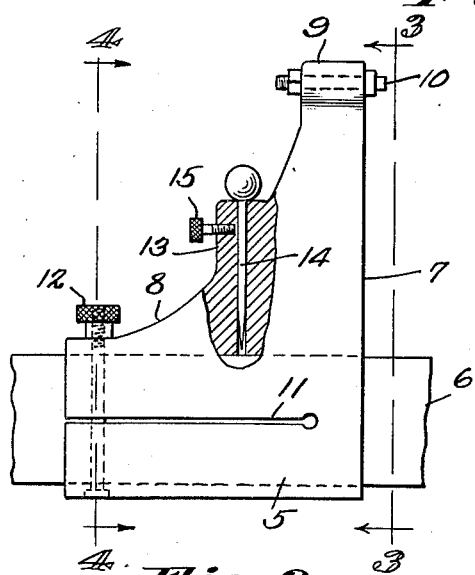 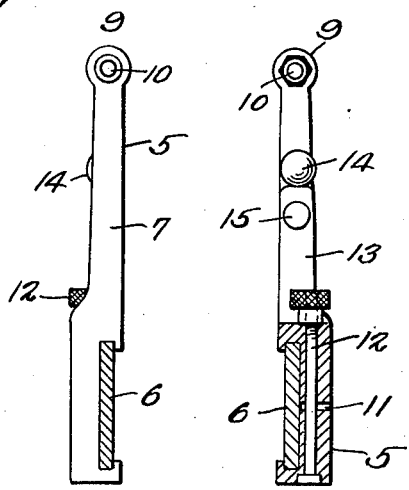
Fig.1.   Fig.2.   Fig.3.   Fig.4.
George Jakubiak
INVENTOR.
BY
Attorneys.

Patented Oct. 31, 1944

2,361,631

UNITED STATES PATENT OFFICE 2,361,631

MEASURING INSTRUMENT

George Ja Kubiak, Barberton, Ohio, assignor of one-half to Himon Farber, Barberton, Ohio Application May 27, 1943, Serial No. 488,719

1 Claim. (Cl. 33—143)

This invention relates to measuring instruments, and aims to provide means whereby the measuring capacity of basic machinist's tools may be rendered more useful, and cover a wide range in accurate measuring.

An important object of the invention is the provision of means for converting the usual straight edge scale rule, used by machinists, into calipers, novel means being provided for constructing the device in such a way that it may be adjusted to practically any range, within certain limits, for inside and outside measuring.

Another object of the invention is to provide removable frames adapted to be used in connection with a straight-edge rule, the frames having means whereby they may be adjustably secured on a straight-edge rule, to hold the frames against movement, after an adjustment of the frames on the straight-edge rule, has been made.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referrings to the drawing:

Figure 1 is an elevational view showing frames constructed in accordance with the invention, as used on a straight-edge rule, converting the rule into capilers.

Figure 2 is a side elevational view of one of the frames.

Figure 3 is a sectional view taken on line 3—3 of Fig. 2.

Figure 4 is a sectional view taken on line 4—4 of Fig. 2.

Referring to the drawing in detail, the invention embodies frames 5 which are mounted for sliding movement on the straight-edge rule or scale 6.

Each frame embodies a straight-edge 7 and a curved edge 8 which are formed at their outer ends, with enlargements 9, in which the anvils 10 are secured.

The base of each frame is formed with a groove in the side thereof, for the reception of the rule 6, as clearly shown by the drawing.

The base of each frame is split as at 11 so that the securing screw 12, which extends through the base may be operated to draw the base into close engagement with the rule, so that after an adjustment has been made along the rule 6, the frame may be secured in its positions of adjustment.

One of the frames is formed with an enlarged portion 13 which is formed with a bore to receive the scriber 14, which is held in position by means of the set screw 15, so that the person using the measuring instrument, will have ready access to the scriber at all times in making indications on the work being measured.

When the device is to be used in measuring outside diameters, the frames are positioned on a straight-edge rule as shown by Fig. 1 of the drawing. Should it be desired to use the instrument for measuring inner diameters of hollow objects, the frames 5 may be reversed on the straight-edge rule, the curved edges 8 of the frames, being directed toward each other.

It might be further stated, that these frames may be constructed of any suitable plastic material having yieldable qualities, so that the portions at opposite sides of the split portions of the bases, may move towards and away from such other under the action of the screws 12, to grip the rule and hold the frames against movement.

When the rule is to be used as a straight-edge measuring instrument, the frames will of course be removed from the rule.

It will also be seen that since the ends of the anvils 10 are of lengths so that they extend beyond the straight and curved edges of the frames, the calipers may be used effectively in measuring the inner and outer diameters of objects, without the necessity of adjusting or replacing the anvils.

What is claimed is:

In a measuring instrument, a straight-edge rule, removable caliper frames, each caliper frame embodying a base formed with a wide longitudinal groove in one of the side faces thereof and in which the straight edge rule is disposed, said base having a longitudinal split portion extending inwardly from one end thereof, providing movable base portions adapted to grip the rule, a bolt extending vertically through the base at a point adjacent to the outer end of the base, a nut on the bolt adapted to draw the movable base portions into close engagement with the straight edge rule, securing the base against movement on the rule, an enlargement rising from the base, and a caliper anvil mounted on the enlargement, adjacent to the upper end thereof.

GEORGE JA KUBIAK.